(12) United States Patent
Lin et al.

(10) Patent No.: US 11,290,994 B2
(45) Date of Patent: Mar. 29, 2022

(54) SIGNAL TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Yanan Lin, Dongguan (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/346,295

(22) PCT Filed: Nov. 3, 2016

(86) PCT No.: PCT/CN2016/104443
§ 371 (c)(1),
(2) Date: Apr. 30, 2019

(87) PCT Pub. No.: WO2018/081973
PCT Pub. Date: May 11, 2018

(65) Prior Publication Data
US 2020/0059903 A1    Feb. 20, 2020

(51) Int. Cl.
*H04L 5/00* (2006.01)
*H04W 72/04* (2009.01)

(52) U.S. Cl.
CPC ......... *H04W 72/042* (2013.01); *H04L 5/0007* (2013.01); *H04L 5/0048* (2013.01);
(Continued)

(58) Field of Classification Search
CPC ... H04L 5/0007; H04L 5/0023; H04L 5/0048; H04L 5/0053; H04L 5/0083;
(Continued)

(56) References Cited

U.S. PATENT DOCUMENTS 9,144,070 B2 * 9/2015 Yang .................... H04W 72/042
9,148,272 B2 * 9/2015 Yang ........................ H04L 5/001
(Continued)

FOREIGN PATENT DOCUMENTS

CN     103037511 A    4/2013
CN     103404046 A    11/2013
(Continued)

OTHER PUBLICATIONS

International Search Report in international application No. PCT/CN2016/104443, dated Jul. 19, 2017.
(Continued)

*Primary Examiner* — Alpus Hsu (57) ABSTRACT

Disclosed in embodiments of the present invention are a signal transmission method, a network device, and a terminal device. The method comprises: sending indication information to a first terminal device, the indication information being used for indicating a resource region used for receiving a downlink control signal by the first terminal device; and sending the downlink control signal to the first terminal device in the resource region. By means of the method, the network device and the terminal device in the embodiments of the present invention, system performance can be improved, and energy consumption of the terminal device can be reduced.

19 Claims, 4 Drawing Sheets

(52) U.S. Cl.
CPC .......... *H04L 5/0053* (2013.01); *H04L 5/0094* (2013.01); *H04W 72/0446* (2013.01)

(58) Field of Classification Search
CPC .. H04L 5/0091; H04L 5/0094; H04W 72/042; H04W 72/0446; Y02D 70/00
See application file for complete search history.

(56) References Cited

U.S. PATENT DOCUMENTS

| | | | | |
|---|---|---|---|---|
| 9,167,574 | B2* | 10/2015 | Chen | H04L 5/0053 |
| 9,312,993 | B2* | 4/2016 | Seo | H04W 72/0453 |
| 9,374,819 | B2* | 6/2016 | Kim | H04B 7/2656 |
| 9,401,792 | B2* | 7/2016 | Lee | H04W 72/042 |
| 9,420,609 | B2* | 8/2016 | Abe | H04W 72/1273 |
| 9,432,138 | B2 | 8/2016 | Kang | |
| 9,462,582 | B2* | 10/2016 | Feng | H04W 72/042 |
| 9,544,119 | B2* | 1/2017 | Park | H04L 1/0046 |
| 9,641,230 | B2* | 5/2017 | Park | H04B 7/0408 |
| 9,693,347 | B2* | 6/2017 | Lee | H04L 1/1893 |
| 9,756,633 | B2* | 9/2017 | Abe | H04L 5/0053 |
| 9,794,914 | B2* | 10/2017 | Jeong | H04W 28/06 |
| 9,893,846 | B2* | 2/2018 | Yu | H04L 1/1893 |
| 10,064,169 | B2* | 8/2018 | Bai | H04W 52/325 |
| 2013/0039284 | A1 | 2/2013 | Marinier | |
| 2013/0100900 | A1* | 4/2013 | Lee | H04W 4/70 370/329 |
| 2013/0163556 | A1 | 6/2013 | Lee et al. | |
| 2014/0003349 | A1 | 1/2014 | Kang | |
| 2014/0003379 | A1 | 1/2014 | Kang | |
| 2014/0198726 | A1 | 7/2014 | Xu et al. | |
| 2014/0254517 | A1 | 9/2014 | Nam et al. | |
| 2014/0269595 | A1 | 9/2014 | Lee et al. | |
| 2014/0348095 | A1* | 11/2014 | Nogami | H04B 7/06 370/329 |
| 2015/0181573 | A1* | 6/2015 | Takeda | H04L 5/0048 370/329 |
| 2015/0282128 | A1* | 10/2015 | Cui | H04L 27/26 370/329 |
| 2015/0296488 | A1 | 10/2015 | Shimezawa et al. | |
| 2016/0094327 | A1* | 3/2016 | Han | H04W 72/0413 370/329 |
| 2016/0192341 | A1 | 6/2016 | Park et al. | |
| 2016/0242159 | A1* | 8/2016 | Ho | H04B 7/0617 |
| 2016/0316460 | A1 | 10/2016 | Lee et al. | |
| 2017/0289974 | A1 | 10/2017 | Lee et al. | |
| 2018/0192409 | A1* | 7/2018 | Yang | H04W 72/044 |

FOREIGN PATENT DOCUMENTS

| | | |
|---|---|---|
| CN | 103716917 A | 4/2014 |
| CN | 103857041 A | 6/2014 |
| RU | 2589892 C2 | 7/2016 |
| WO | 2012150310 A1 | 11/2012 |
| WO | 2014082454 A1 | 6/2014 |
| WO | 2015170871 A1 | 11/2015 |
| WO | 2016106683 A1 | 7/2016 |

OTHER PUBLICATIONS

Written Opinion of the International Search Authority in international application No. PCT/CN2016/104443, dated Jul. 19, 2017.
Supplementary European Search Report in the European application No. 16920639.8, dated Jul. 5, 2019.
English translation of the Written Opinion of the International Search Authority in the international application No. PCT/CN2016/104443, dated Jul. 19, 2017.
First Office Action of the Russian application No. 2019117206, dated Feb. 11, 2020.
Alcatel-Lucent Shanghai Bell, Alcatel-Lucent, Remaining details of Search Space and Aggregation Levels, 3GPP TSG-RAN WG1#71 R1-124872, 3GPP Nov. 3, 2012 (documents showing well-known arts).
NTT Docomo, Inc., s(E)PDCCH for shortened TTI, 3GPP TSG-RAN WG1#86b R1-1610045, 3GPP Oct. 1, 2016 (documents indicating well-known arts).
Nokia, Alcatel-Lucent Shanghai Bell, Beam management—DCI monitoring, 3GPP TSG RAN WG1#86b R1-1610240, 3GPP Sep. 30, 2016 (documents showing well-known arts).
First Office Action of the Brazilian application No. BR1120190088040, dated Sep. 1, 2020.
First Office Action of the Japanese application No. 2019-522848, dated Sep. 25, 2020.
Written Opinion of the Singaporean application No. 11201903884W, dated May 16, 2020.
First Office Action of the European application No. 16920639.8, dated Jun. 23, 2020.
Ericsson. "Summary of offline discussion on downlink control channels"; TSG-RAN WG1 #86bis, R1-1610736, Lisbon, Portugal, Oct. 10-14, 2016.
NTT Docomo, Inc. "Offline outcome of Wednesday evening on 8.1.7.1"; 3GPP TSG RAN WG1 Meeting #86bis, R1-1610943, Lisbon, Portugal Oct. 10-14, 2016.
Panasonic "Multiplexing of ePDCCHs and ePDCCH RE mapping" 3GPP TSG RAN WG1 Meeting #68 R1-120237 Dresden, Germany, Feb. 6-10, 2012.
First Office Action of the Indian application No. 201917021225, dated Jan. 29, 2021.
Second Office Action of the Japanese application No. 2019-522848, dated Feb. 5, 2021.
Office Action of the Taiwanese application No. 106137479, dated Jun. 24, 2021.
Second Office Action of the European application No. 16920639.8, dated Apr. 29, 2021.
Office Action of the Australian application No. 2016428406, dated Aug. 6, 2021.
Second Written Opinion of the Singaporean application No. 11201903884W, dated Nov. 1, 2021.
3GPP TSG RAN WG1 Meeting #68bis R1-121163, Panasonic, Multiplexing of ePDCCHs and ePDCCH RE mapping, Jeju, Korea, Mar. 26-30, 2012.
Second Office Action of the Australian application No. 2016428406, dated Nov. 10, 2021.

* cited by examiner

FIG. 1

100  Indication information is sent to a first terminal device, the
indication information indicating a resource region for the first   ~ S110
terminal device to receive a downlink control signal The downlink control signal is sent to the first terminal device in   ~ S120
the resource region

SIGNAL TRANSMISSION METHOD, TERMINAL DEVICE, AND NETWORK DEVICE

TECHNICAL FIELD

Embodiments of the disclosure relate to the field of communication, and particularly, to a signal transmission method, a terminal device and a network device.

BACKGROUND

In Long Term Evolution (LTE), a Physical Downlink Control Channel (PDCCH) control region is formed by first few Orthogonal Frequency Division Multiplexing (OFDM) symbols of each subframe and spans the whole system bandwidth (less than or equal to 20 MHz). Since a system bandwidth of a future communication system is much larger than that of an LTE system, it is not so economical for a terminal to monitor the whole frequency band for detection of a control signal and high energy consumption of the terminal may be caused.

SUMMARY

In view of this, the embodiments of the disclosure provide a signal transmission method and device, which may improve system performance and reduce energy consumption of a terminal device.

A first aspect provides a signal transmission method, which may include that: indication information is sent to a first terminal device, the indication information indicating a resource region for the first terminal device to receive a downlink control signal; and the downlink control signal is sent to the first terminal device in the resource region.

The terminal device is caused to detect the control signal in a fixed region resource, so that system performance may be improved and energy consumption of the terminal device may be reduced.

Optionally, a network device may allocate a resource region for each terminal device, and the resource region may be configured to transmit a dedicated downlink control signal of the corresponding terminal device. The network device may also allocate a resource region for multiple terminal devices, and the resource region is configured to transmit dedicated downlink control signals corresponding to the multiple terminal devices respectively. The network device may also allocate a resource region for the multiple terminal devices to transmit a common control signal of the multiple terminal devices. The network device may also not specially allocate a resource region for transmission of the common control signal and may send the common downlink control signal in the resource region allocated to transmit the dedicated downlink control signal for each terminal device to ensure that each terminal device may detect it.

In a possible implementation, the resource region may include at least one Physical Resource Block (PRB) and, when the resource region includes multiple PRBs, any two of the multiple PRBs may be successive or discrete on a frequency domain.

In a possible implementation, the indication information may include a first bit table, each bit in the first bit table may correspond to each PRB in a system bandwidth and, when a bit in the first bit table is a first value, it may be indicated that the corresponding PRB belongs to the resource region.

In a possible implementation, the indication information may include a starting frequency point and a second bit table, multiple bits in the second bit table may correspond to multiple successive PRBs from the starting frequency point, the multiple bits may correspond to the multiple PRBs one-to-one and, when a bit in the second bit table is the first value, it may be indicated that the corresponding PRB belongs to the resource region.

In a possible implementation, the indication information may include the starting frequency point indicating a starting position of the resource region in the system bandwidth and an ending frequency point indicating an ending position of the resource region in the system bandwidth.

In a possible implementation, the indication information may include the starting frequency point indicating a starting position of the resource region in the system bandwidth and a bandwidth of the resource region.

Optionally, the abovementioned indication manners for the resource region may also be combined.

In a possible implementation, if the indication information indicates a frequency-domain parameter of the resource region, the indication information may be sent to the first terminal device through a system message or high-layer signaling; and if the indication information indicates a time-domain parameter of the resource region, the indication information may be sent to the first terminal device through the system message, the high-layer signaling or physical-layer signaling.

In a possible implementation, the resource region may include at least one successive OFDM symbol starting from a first OFDM symbol in a first slot or a first mini-slot, and the indication information may include a total number of OFDM symbols belonging to the first slot or the first mini-slot in the resource region.

In a possible implementation, the high-layer signaling may include a Radio Resource Control (RRC) message, the system message may include a System Information Block (SIB) message and a Physical Broadcast Channel (PBCH) message, and the physical-layer signaling may include common signaling sent through at least one slot or at least one slot or dedicated signaling for the first terminal device.

In a possible implementation, the operation that the downlink control signal is sent to the first terminal device in the resource region may further include that: a beam corresponding to the resource region is adopted to send the downlink control signal to the first terminal device in the resource region.

Optionally, the network device may send a downlink control signal on a certain OFDM symbol in a specific beamforming manner.

In a possible implementation, the method may further include that: each of at least one control channel configured to bear the downlink control signal is divided into at least one control channel element and mapped onto the resource region for sending, multiple control channels corresponding to multiple terminal devices one-to-one and the multiple terminal devices including the first terminal device.

In a possible implementation, different control channel elements in the at least one control channel may be mapped onto different PRBs and/or different OFDM symbols in the resource region, and/or at least one control channel element of a first control channel of the at least one control channel may be mapped onto all OFDM symbols in the same PRB in the resource region, and/or different control channel elements in the at least one control channel may be mapped onto at least part of PRBs in the same OFDM symbol in the resource region.

In a possible implementation, the method may further include that: the resource region corresponding to a beam is determined according to the beam adopted by the first terminal device; or the resource region corresponding to a neighbor cell is determined according to the neighbor cell of the first terminal device; or the resource region is determined according to a position of the first terminal device in a cell and a mobility characteristic of the first terminal device; or the resource region is determined according to a load of a network device.

A second aspect provides a signal transmission method, which may include that: indication information sent by a network device is received, the indication information indicating a resource region for a first terminal device to receive a downlink control signal; and the downlink control signal sent by the network device is received in the resource region according to the indication information.

The terminal device is caused to detect the control signal in a fixed region resource, so that system performance may be improved and energy consumption of the terminal device may be reduced.

In a possible implementation, the resource region may include at least one Physical Resource Block (PRB) and, when the resource region includes multiple PRBs, any two of the multiple PRBs may be successive or discrete on a frequency domain.

In a possible implementation, the indication information may include a first bit table, each bit in the first bit table may correspond to each PRB in a system bandwidth and, when a bit in the first bit table is a first value, it may be indicated that the corresponding PRB belongs to the resource region.

In a possible implementation, the indication information may include a starting frequency point and a second bit table, multiple bits in the second bit table may correspond to multiple successive PRBs from the starting frequency point, the multiple bits may correspond to the multiple PRBs one-to-one and, when a bit in the second bit table is the first value, it may be indicated that the corresponding PRB belongs to the resource region.

In a possible implementation, the indication information may include the starting frequency point indicating a starting position of the resource region in the system bandwidth and an ending frequency point indicating an ending position of the resource region in the system bandwidth.

In a possible implementation, the indication information may include the starting frequency point indicating a starting position of the resource region in the system bandwidth and a bandwidth of the resource region.

In a possible implementation, the resource region may include at least one successive OFDM symbol starting from a first OFDM symbol in a first slot or a first mini-slot, and the indication information may include a total number of OFDM symbols belonging to the first slot or the first mini-slot in the resource region.

In a possible implementation, if the indication information indicates a frequency-domain parameter of the resource region, the indication information may be sent to the first terminal device through a system message or high-layer signaling; and if the indication information indicates a time-domain parameter of the resource region, the indication information may be sent to the first terminal device through the system message, the high-layer signaling or physical-layer signaling.

In a possible implementation, the high-layer signaling may include a Radio Resource Control (RRC) message, the system message may include a System Information Block (SIB) message and a Physical Broadcast Channel (PBCH) message, and the physical-layer signaling may include common signaling sent through at least one slot or at least one slot or dedicated signaling for the first terminal device.

In a possible implementation, the operation that the downlink control signal sent by the network device is received in the resource region according to the indication information may include that: at least one control channel element corresponding to a downlink control channel of the first terminal device is received from the network device in the resource region according to the indication information; and the downlink control signal is generated by combining the at least one control channel element.

In a possible implementation, the operation that the downlink control signal sent by the network device in the resource region may further include that: a beam corresponding to the resource region is adopted to receive the downlink control signal sent by the network device in the resource region.

A third aspect provides a network device, which is configured to execute the method in the first aspect or any possible implementation of the first aspect. Specifically, the network device includes units configured to execute the method in the first aspect or any possible implementation of the first aspect.

A fourth aspect provides a terminal device, which is configured to execute the method in the second aspect or any possible implementation of the second aspect. Specifically, the terminal device includes units configured to execute the method in the second aspect or any possible implementation of the second aspect.

A fifth aspect provides a network device, which includes a memory, a processor, a transceiver, a communication interface and a bus system. The memory, the processor and the transceiver are connected through the bus system, the memory is configured to store an instruction, the processor is configured to execute the instruction stored in the memory, and when the instruction is executed, the processor executes the method in the first aspect and controls the transceiver to receive input data and information and output data such as an operation result.

A sixth aspect provides a terminal device, which includes a memory, a processor, a transceiver, a communication interface and a bus system. The memory, the processor and the transceiver are connected through the bus system, the memory is configured to store an instruction, the processor is configured to execute the instruction stored in the memory, and when the instruction is executed, the processor executes the method in the second aspect and controls the transceiver to receive input data and information and output data such as an operation result.

These aspects or other aspects of the application will become clearer and easier to understand through the following descriptions about the embodiments.

DETAILED DESCRIPTION

The technical solutions in the embodiments of the disclosure will be clearly and completely described below in combination with the drawings in the embodiments of the disclosure.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a further 5th-Generation (5G) system.

Particularly, the technical solutions of the embodiments of the disclosure may be applied to various nonorthogonal multiple access technology-based communication systems, for example, a Sparse Code Multiple Access (SCMA) system and a Low Density Signature (LDS) system, and of course, the SCMA system and the LDS system may also have other names in the field of communication. Furthermore, the technical solutions of the embodiments of the disclosure may be applied to multi-carrier transmission systems adopting nonorthogonal multiple access technologies, for example, OFDM, Filter Bank Multi-Carrier (FBMC), Generalized Frequency Division Multiplexing (GFDM) and Filtered-OFDM (F-OFDM) systems adopting the nonorthogonal multiple access technologies.

In the embodiments of the disclosure, a terminal device may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, a terminal device in a future 5G network, a terminal device in a future evolved Public Land Mobile Network (PLMN) or the like. There are no limits made in the embodiments of the disclosure.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario, or the network device may be a relay station, an access point, a vehicle-mounted device, a wearable device, a network device in the future 5G network, a network device in the future evolved PLMN or the like. There are no limits made in the embodiments of the disclosure.

Figure 1:
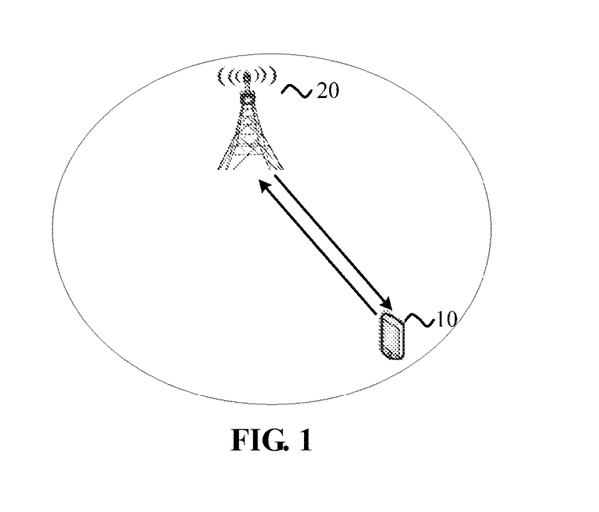
FIG. 1 illustrates a schematic diagram of a possible application scenario according to an embodiment of the disclosure.

FIG. 1 illustrates a schematic diagram of an application scenario according to an embodiment of the disclosure. A communication system in FIG. 1 may include a terminal device 10 and a network device 20. The network device 20 is configured to provide communication service for the terminal device 10 for access to a core network. The terminal device 10 searches a synchronization signal, broadcast signal and the like sent by the network device 20 to access the network, thereby communicating with the network. Arrows shown in FIG. 1 may represent uplink/downlink transmission implemented through a cellular link between the terminal device 10 and the network device 20.

A PDCCH of LTE is sent on first few OFDM symbols of each subframe and is demodulated by use of a common pilot signal of a cell. In a later evolved release, an Enhanced Physical Downlink Control Channel (E-PDCCH) signal is further introduced into LTE. Unlike the PDCCH, the E-PDCCH signal is sent in the whole PRB usually sending data and is demodulated by use of a Demodulation Reference Signal (DMRS). Such a manner has the advantages of independence of the common pilot signal and advantages achieved by some other transmission manners, for example, beamforming and Multiple Input Multiple Output (MIMO).

In terms of system design of a future communication system such as 5G, designs of a multi-antenna array, beamforming and the like are introduced. For example, an original cell is covered with multiple beams and a beam gain may compensate coverage reduction brought by use of a high frequency band to a certain extent, may also reduce mutual interference and enhance system performance. A data channel may be transmitted by use of beamforming. For a control channel, there may be several solutions. One is that transmission of the control channel still covers the whole cell and another is that the control channel is also sent by only one or several beams. 5G also has some other characteristics, for example, supporting a large system bandwidth (high frequency band) and supporting different applications, for example, Ultra-Reliable Low Latency Communications (URLLC) with a high delay requirement. These characteristics require that a control channel design should be different from an LTE system.

Figure 2:
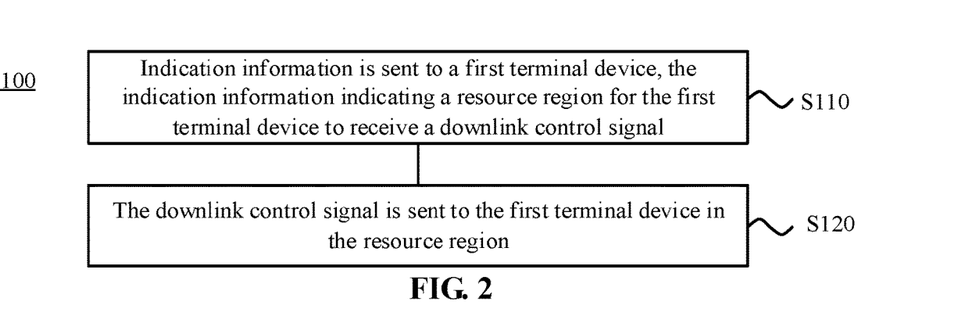
FIG. 2 illustrates a schematic block diagram of a signal transmission method according to an embodiment of the disclosure.

FIG. 2 illustrates a schematic block diagram of a signal transmission method 100 according to an embodiment of the disclosure. As shown in FIG. 2, the method 100 may be executed by a network device and may specifically be executed by a base station. The method 100 includes the following steps.

In S110, indication information is sent to a first terminal device, the indication information indicating a resource region for the first terminal device to receive a downlink control signal.

In S120, the downlink control signal is sent to the first terminal device in the resource region.

Specifically, the network device may select some resources from the whole system bandwidth as the resource region transmitting the downlink control signal and may send the indication information to a terminal device through a system message and the like to notify the terminal device to acquire the downlink control signal in the resource region allocated for it. For example, the network device may allocate a resource region for each terminal device, and the resource region may be configured to transmit a dedicated downlink control signal of the corresponding terminal device. The network device may also allocate a resource region for multiple terminal devices to transmit a common control signal of the multiple terminal devices. The network device may also not specially allocate a resource region for transmission of the common control signal and may send the common downlink control signal in the resource region allocated to transmit the dedicated downlink control signal for each terminal device to ensure that each terminal device may detect it.

It is to be understood that the resource region in the method 100 may be allocated for the first terminal device and specially configured to transmit the downlink control signal of the first terminal device and may also be allocated for multiple terminal devices and configured to transmit dedicated downlink control signals of the multiple terminal devices.

Optionally, if the control signal is transmitted in a beamforming manner, the network device may allocate different resource regions for different beams. For a common control signal, an independent resource region may be allocated and a relatively wide shaped beam or several narrow-band shaped forms are adopted for transmission. No independent resource region may also be allocated for the common control signal and, instead, a common control channel is repeatedly transmitted in different resource regions. The network device may allocate different resource regions for different neighbor cells. The network device may allocate different resource regions according to characteristics of different terminals, and for example, some discontinuous PRBs are allocated for some terminals at an edge of a cell or some terminals moving relatively fast because the number of such terminals is relatively small and sizes of these resource regions may be small, and some successive PRBs are allocated for some terminals in the center of the cell or some terminals which move relatively slowly or are still. The network device may allocate different resource regions according to different loads of a network, and for example, some terminals in a resource region with a relatively high load (long scheduling delay and high control resource or data resource utilization rate) are allocated to a corresponding resource region with a relatively low load (short scheduling delay and low control resource or data resource utilization rate). The network device may allocate different resource regions according to different time and the load of the network, and for example, more resource regions are enabled and allocated under the condition that there are more users in the daytime and at night and, relatively few resource regions are used under the condition that there are fewer users at midnight and weekends.

Figure 3:
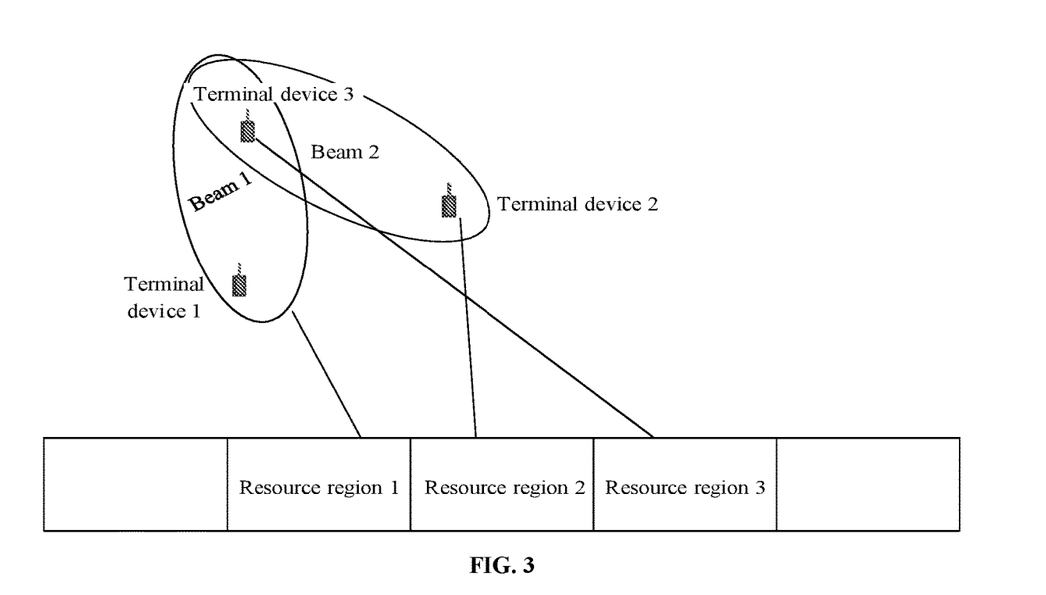
FIG. 3 illustrates a schematic block diagram of allocating resource regions for terminal devices according to an embodiment of the disclosure.

A specific solution of allocating resource regions for terminal devices in the embodiment of the disclosure will be described below in combination with FIG. 3. As shown in FIG. 3, each group may be configured to correspond to control channel transmission of at least one beam. For example, a resource region 1 corresponds to a beam 1, a resource region 2 corresponds to a beam 2 and a resource region 3 corresponds to the beam 1 and the beam 2. Furthermore, the network device may adopt the beam 1 to send a control channel to a terminal device 1 in the resource region 1 and there is made such a hypothesis that the terminal device 1 is a terminal device under coverage of the beam 1. The network device may adopt the beam 2 to send a control channel to a terminal device 2 in the resource region 2 and there is made such a hypothesis that the terminal device 2 is a terminal device under coverage of the beam 2. The network device may also adopt the beam 1 and the beam 2 to send a control channel to a terminal device 3 in the resource region 3 and there is made such a hypothesis that the terminal device 3 is a terminal device at a junction of the beam 1 and the beam 2.

It is to be understood that schematic descriptions are made above only with FIG. 3 as an example and other manners such as neighbor cells may also be adopted for allocation and, for simplicity, will not be elaborated herein one by one.

It is also to be understood that the resource region in the embodiment of the disclosure may be successive or not successive on a frequency domain and may be successive or not successive on a time domain. The indication information sent to the first terminal device by the network device may indicate a frequency-domain resource and may also indicate a time-domain resource.

Figure 4:
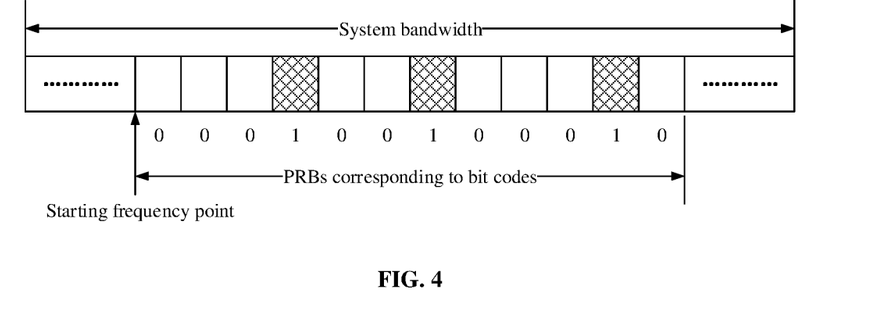
FIG. 4 illustrates a schematic diagram of indicating a frequency-domain parameter of a resource region according to an embodiment of the disclosure.

On the frequency domain, for example, the indication information includes a first bit table, there are one-to-one correspondences between bits in the first bit table and PRBs in a system bandwidth and, and a bit, which is of a first value, in the first bit table indicates that the PRB corresponding to the bit belongs to the resource region. The indication information includes a starting frequency point and a second bit table, multiple bits in the second bit table correspond to multiple successive PRBs from the starting frequency point, there are one-to-one correspondences between the multiple bits and the multiple PRBs and, a bit, which is of a first value, in the second bit table indicates that the PRB corresponding to the bit belongs to the resource region. The indication information may also include the starting frequency point indicating a starting position of the resource region in the system bandwidth and an ending frequency point indicating an ending position of the resource region in the system bandwidth. The indication information may further include the starting frequency point indicating a starting position of the resource region in the system bandwidth and a bandwidth of the resource region. FIG. 4 illustrates use of the starting frequency point and bit codes for indication of the resource region for the first terminal device. In the figure, a bit corresponds to a PRB, a value "1" indicates that the PRB belongs to the resource region for the first terminal device, and a value "0" indicates that the PRB does not belong to the resource region for the first terminal device. A bit code table may also be configured in a manner that the value "0" indicates that the PRB belongs to the resource region for the first terminal device and the value "1" indicates that the PRB does not belong to the resource region for the first terminal device. From FIG. 4, it can be seen that the bit code table is 12-bit and the resource region for the first terminal device includes three PRBs.

Furthermore, the indication information configured to indicate a frequency-domain parameter of the resource region may be notified to the terminal device through high-layer signaling, for example, an RRC message. The indication information may also be broadcast to the terminal device through a system message, for example, a broadcast channel. The terminal device may select the corresponding resource region according to some specific associations. For example, a certain resource region is associated with a certain frequency band, and the terminal device, if successfully accessing the frequency band, may use the resource region to receive its own downlink control signal. For another example, a certain resource region is associated with a certain beam in a multi-beam cell, and a terminal, if successfully accessing the beam, may use the resource region to receive its own downlink control signal.

On the time domain, the resource region includes at least one successive OFDM symbol starting from a first OFDM symbol in a first slot or a first mini-slot, and the indication information includes a total number of OFDM symbols belonging to the first slot or the first mini-slot in the resource region. For example, the specific OFDM symbols configured to transmit the control signal may be semi-statically notified to the terminal device, and the indication information may indicate a configuration and number of first OFDM symbols of the resource region. Specifically, a dynamic common control signal may be adopted for notification and the common control signal may be sent on a first OFDM symbol of each slot or mini-slot to notify the number of the first few OFDM symbols configured to transmit the control signal in the corresponding resource region to the terminal. For example, if at most three first OFDM symbols are adopted to transmit the control signal, the dynamic signal may be transmitted by use of two bits: 00 represents 0 OFDM symbol, 01 represents one OFDM symbol, 10 represents two OFDM symbols and 11 represents three OFDM symbols.

This configuration may also be notified by a semi-static signal and then may be modified by a dynamic signal. For example, the semi-static signal supports use of two OFDM symbols for transmission of the control signal, if the terminal detects that the dynamic signal indicates three OFDM symbols, three OFDM symbols in a present subframe may be configured to transmit the control signal and, if the terminal does not detect this dynamic signal, the control signal is supposed to be sent by two OFDM symbols. No common signal may also be adopted to indicate a control channel region on the time domain and, instead, the terminal performs blind detection on the first few OFDM symbols in each slot or mini-slot. For a control signal transmitted in two stages, an OFDM symbol where a second stage of the control signal may be detected from a first stage of the control signal.

Furthermore, the indication information configured to indicate a time-domain parameter of the resource region may be notified to the terminal device through the high-layer signaling, for example, the RRC message. The indication information may also be broadcast to the terminal device through the system message, for example, the broadcast channel. The indication information may also be sent to the terminal device through physical-layer signaling, for example, common signaling sent through at least one slot or at least one mini-slot or dedicated signaling for the first terminal device.

In case of a multi-beam system, a resource region (the numbers of frequency-domain PRBs and time-domain OFDM symbols) in each beam may be independently configured. The same resource region may be repeatedly or partially repeatedly used in different beams. If the common signal is adopted to indicate a total number of OFDM symbols sending the control signal, a respectively common signal of each beam may be sent in a respective beamforming manner for sending data to indicate a total number of OFDM symbols required to be used for the control signal in the respective beam. The common signals in different beams may indicate different numbers of OFDM symbols configured to send the control signal. The resource region in each beam may also be semi-statically configured and the network device may notify the resource region corresponding to each beam to a terminal user through the broadcast channel or the high-layer signaling.

For some applications with relatively high delay requirements, for example, URLLC, it may be limited that only a first OFDM symbol in a slot or a mini-slot is adopted to send the control signal. Under this condition, no common signal is required to indicate a total number of OFDM symbols required by the control signal. Of course, in case of dynamic multiplexing of the application and another application, it is impossible for the terminal to predict the specific application for which the present slot or mini-slot is to be used, and the terminal may still acquire the number of the OFDM symbols required to be used for the control signal through a common channel.

Optionally, in the embodiment of the disclosure, the method further includes that: each of at least one control channel configured to bear the downlink control signal is divided into at least one control channel element and mapped onto the resource region for sending, multiple control channels corresponding to multiple terminal devices one-to-one and the multiple terminal devices including the first terminal device.

Those skilled in the art know that dividing the control channel into multiple control channel elements and mapping them onto the resource region refers to dividing the control signal into a few parts and mapping them to different resources in the resource region for transmission.

Furthermore, different control channel elements in the at least one control channel are mapped onto different PRBs and/or different OFDM symbols in the resource region, and/or at least one control channel element of a first control channel of the at least one control channel is mapped onto all OFDM symbols in the same PRB in the resource region, and/or different control channel elements in the at least one control channel are mapped onto at least part of PRBs in the same OFDM symbol in the resource region.

The solution of multiplexing a resource region for control channels of a few terminal devices will be described below in combination with FIG. 5 to FIG. 7 in detail.

Figure 5:
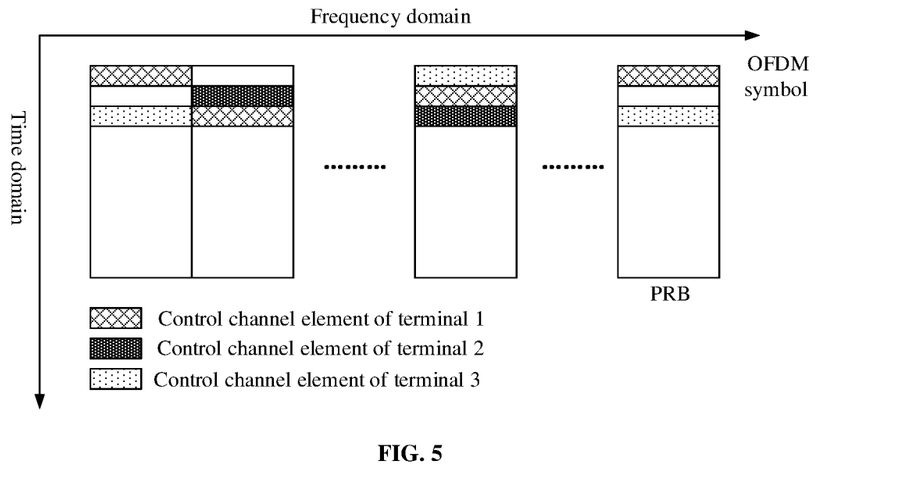
FIG. 5 illustrates a mapping diagram of control channel elements of multiple terminal devices in a resource region according to an embodiment of the disclosure.

As shown in FIG. 5, the resource region includes four PRBs, two PRBs are successive and the other two PRBs are not successive. A control channel of a terminal 1 is divided into four control channel elements mapped onto different OFDM symbols in the four PRBs respectively. A control channel of a terminal 2 is divided into two control channel elements mapped onto different OFDM symbols in two PRBs. A control channel of a terminal 3 is divided into three control channel elements mapped onto different OFDM symbols in three PRBs.

The control channels of the multiple terminal devices are divided into multiple control channel elements and these elements are interleaved and mapped into a resource region to obtain a higher frequency-domain and time-domain diversity gain.

Figure 6:
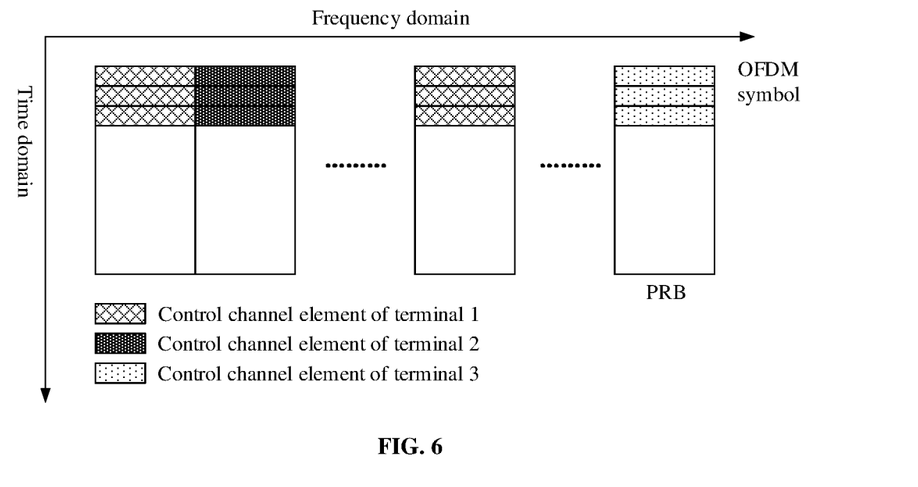
FIG. 6 illustrates another mapping diagram of control channel elements of multiple terminal devices in a resource region according to an embodiment of the disclosure.

As shown in FIG. 6, the resource region includes four PRBs, two PRBs are successive and the other two PRBs are not successive. A control channel of a terminal 1 is divided into six control channel elements mapped onto three OFDM symbols in a first PRB and three OFDM symbols in a third PRB respectively. A control channel of a terminal 2 is divided into three control channel elements mapped onto three OFDM symbols in a second PRB. A control channel of a terminal 3 is divided into three control channel elements mapped onto three OFDM symbols in a fourth PRB.

The control channels of the multiple terminal devices are divided into multiple control channel elements, these control channel elements may be transmitted from one or more PRBs and a control signal of only one terminal is transmitted on each PRB (PRB or PRB subset). By such a multiplexing solution, a frequency-domain diversity gain may be utilized better and, in addition, detection complexity of the terminal is also reduced.

Figure 7:
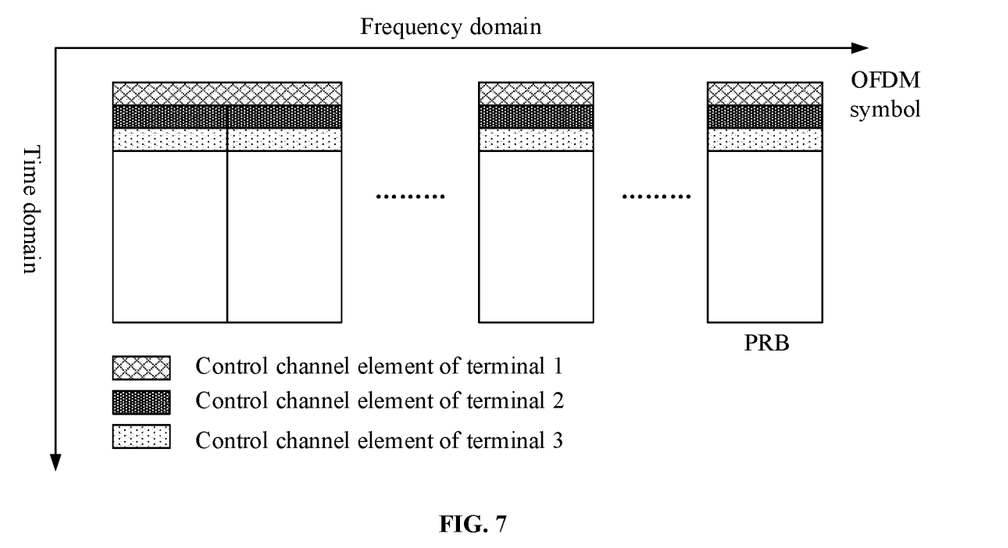
FIG. 7 illustrates another mapping diagram of control channel elements of multiple terminal devices in a resource region according to an embodiment of the disclosure.

As shown in FIG. 7, the resource region includes four PRBs, two PRBs are successive and the other two PRBs are not successive. A control channel of a terminal 1 is divided into four control channel elements mapped onto first OFDM symbols in all the PRBs of the resource region respectively. A control channel of a terminal 2 is divided into four control channel elements mapped onto second OFDM symbols in all the PRBs of the resource region respectively. A control channel of a terminal 3 is divided into four control channel elements mapped onto third OFDM symbols in all the PRBs of the resource region respectively.

The control channels of the multiple terminals are transmitted from different OFDM symbols. For example, for service with a high delay requirement, a corresponding control signal may be transmitted through the first OFDM symbols and, for service with a low delay requirement, a corresponding control signal may be transmitted through the second or third OFDM symbols. If multiple terminals are required to accept the service with the high delay requirement, their control signals may also be transmitted through the first OFDM symbols. By such a solution, the network device may also conveniently apply different analogue beamforming to different control signals for beam scanning. For example, a certain type of analogue beamforming is applied to the first OFDM symbols to orient the control signal to point to a terminal user for which transmission is implemented through the first OFDM symbols to increase a beamforming gain of the control signal transmitted through the first OFDM symbols. Analogue beamforming different from that for the first OFDM symbols may be applied to the second OFDM symbols to orient the control signal to point a terminal user for which transmission is implemented through the second OFDM symbols to increase a beamforming gain of the control signal transmitted through the second OFDM symbols.

It is to be understood that a size of a control channel element is described as an OFDM symbol on the time domain and a PRB on the frequency domain and it may also be two OFDM symbols on the time domain and a PRB on the frequency domain. The size of the control channel element will not be limited in the embodiment of the disclosure as long as a frequency-domain size and a time-domain size are multiples of a PRB and an OFDM symbol respectively.

If directions of beamforming required by multiple terminals are appropriate, the terminals may be grouped and their control signals may be transmitted through one or more OFDM symbols and similar analogue beamforming is applied. For example, when the terminal 1 and the terminal 2 are located in the same coverage, their control signals may be arranged to be transmitted through the first OFDM symbols and transmitted in the same analogue beamforming manner. Similarly, when the terminal 3 and the terminal 4 are located in the same coverage, their control signals may be arranged to be transmitted through the second OFDM symbols and transmitted in another analogue beamforming manner.

Figure 8:
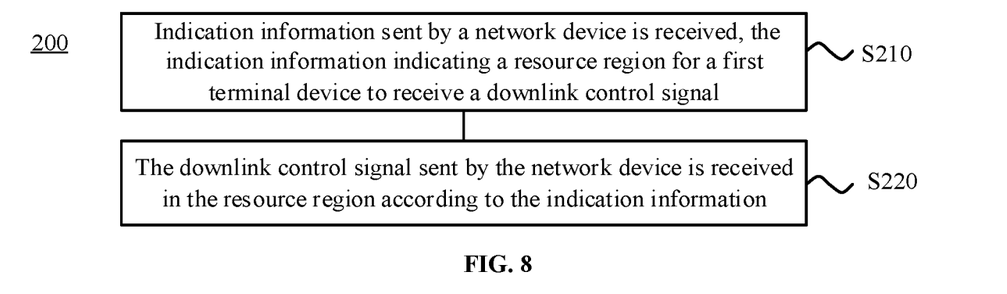
FIG. 8 illustrates another schematic block diagram of a signal transmission method according to an embodiment of the disclosure.

FIG. 8 illustrates a schematic block diagram of a signal transmission method 200 according to an embodiment of the disclosure. As shown in FIG. 8, the method 200 may be executed by a terminal device and may specifically be executed by UE. The method 200 includes the following steps.

In S210, indication information sent by a network device is received, the indication information indicating a resource region for a first terminal device to receive a downlink control signal.

In S220, the downlink control signal sent by the network device is received in the resource region according to the indication information.

In such a manner, according to the signal transmission method provided by the embodiment of the disclosure, the terminal device is caused to detect the control signal in a fixed region resource, so that system performance may be improved and energy consumption of the terminal device may be reduced.

It is to be understood that the resource region in the embodiment of the disclosure may be successive or not successive on a frequency domain and may be successive or not successive on a time domain. The indication information sent to the first terminal device by the network device may indicate a frequency-domain resource and may also indicate a time-domain resource.

On the frequency domain, for example, the indication information includes a first bit table, there are one-to-one correspondences between bits in the first bit table and PRBs in a system bandwidth and, and a bit, which is of a first value, in the first bit table indicates that the PRB corresponding to the bit belongs to the resource region. The indication information includes a starting frequency point and a second bit table, multiple bits in the second bit table correspond to multiple successive PRBs from the starting frequency point, there are one-to-one correspondences between the multiple bits and the multiple PRBs and, a bit, which is of a first value, in the second bit table indicates that the PRB corresponding to the bit belongs to the resource region. The indication information may also include the starting frequency point indicating a starting position of the resource region in the system bandwidth and an ending frequency point indicating an ending position of the resource region in the system bandwidth. The indication information may further include the starting frequency point indicating a starting position of the resource region in the system bandwidth and a bandwidth of the resource region.

Furthermore, the indication information configured to indicate a frequency-domain parameter of the resource region may be notified to the terminal device through high-layer signaling, for example, an RRC message. The indication information may also be broadcast to the terminal device through a system message, for example, a broadcast channel. The terminal device may select the corresponding resource region according to some specific associations. For example, a certain resource region is associated with a certain frequency band, and the terminal device, if successfully accessing the frequency band, may use the resource region to receive its own downlink control signal. For another example, a certain resource region is associated with a certain beam in a multi-beam cell, and a terminal, if successfully accessing the beam, may use the resource region to receive its own downlink control signal.

On the time domain, the resource region includes at least one successive OFDM symbol starting from a first OFDM symbol in a first slot or a first mini-slot, and the indication information includes a total number of OFDM symbols belonging to the first slot or the first mini-slot in the resource region. For example, the specific OFDM symbols configured to transmit the control signal may be semi-statically notified to the terminal device, and the indication information may indicate a configuration and number of first OFDM symbols of the resource region.

Furthermore, the indication information configured to indicate a time-domain parameter of the resource region may be notified to the terminal device through the high-layer signaling, for example, the RRC message. The indication information may also be broadcast to the terminal device through the system message, for example, the broadcast channel. The indication information may also be sent to the terminal device through physical-layer signaling, for example, common signaling sent through at least one slot or at least one mini-slot or dedicated signaling for the first terminal device.

Optionally, in the embodiment of the disclosure, the operation that the downlink control signal sent by the network device is received in the resource region according to the indication information includes that: at least one control channel element corresponding to a downlink control channel of the first terminal device is received from the network device in the resource region according to the indication information; and the downlink control signal is generated by combining the at least one control channel element.

Those skilled in the art know that dividing the control channel into multiple control channel elements and mapping them onto the resource region refers to dividing the control signal into a few parts and mapping them to different resources in the resource region for transmission. Correspondingly, the terminal device acquires the divided parts from different resources in the resource region and combines them into the downlink control signal.

Optionally, in the embodiment of the disclosure, the operation that the downlink control signal sent by the network device in the resource region further includes that: a beam corresponding to the resource region is adopted to receive the downlink control signal sent by the network device in the resource region.

It is to be understood that interaction between the terminal device and the network device and related properties, functions and the like described from a terminal device side correspond to related properties and functions described from a network device side and will not be elaborated herein for simplicity.

It is also to be understood that, in various embodiments of the application, a magnitude of a sequence number of each process does not mean an execution sequence and the execution sequence of each process should be determined by its function and an internal logic and should not form any limit to an implementation process of the embodiments of the disclosure.

The signal transmission method according to the embodiments of the disclosure is described above in detail and a signal transmission device according, to the embodiments of the disclosure will be described below in combination with FIG. 9 to FIG. 12. The technical characteristics described in the method embodiments are applied to the following device embodiments.

Figure 9:
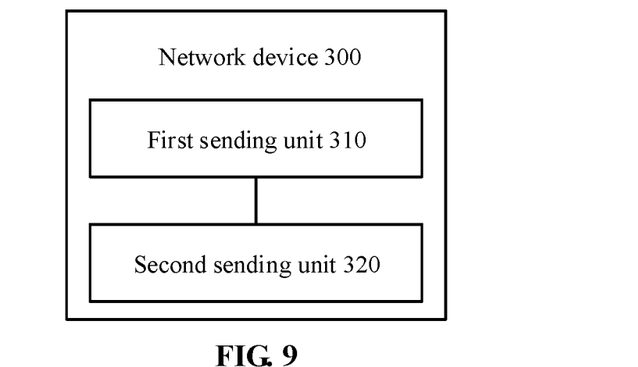
FIG. 9 illustrates a schematic block diagram of a signal transmission network device according to an embodiment of the disclosure.

FIG. 9 illustrates a signal transmission network device 300 according to an embodiment of the disclosure. As shown in FIG. 9, the network device 300 includes a first sending unit 310 and a second sending unit 320.

The first sending unit 310 is configured to send indication information to a first terminal device, the indication information indicating a resource region for the first terminal device to receive a downlink control signal.

The second sending unit 320 is configured to send the downlink control signal to the first terminal device in the resource region.

In such a manner, according to the signal transmission network device provided by the embodiment of the disclosure, the terminal device is caused to detect the control signal in a fixed region resource, so that system performance may be improved and energy consumption of the terminal device may be reduced.

Optionally, in the embodiment of the disclosure, the resource region includes at least one PRB and, when the resource region includes multiple PRBs, any two of the multiple PRBs are successive or discrete on a frequency domain.

Optionally, in the embodiment of the disclosure, the indication information includes a first bit table, there are one-to-one correspondences between bits in the first bit table and PRBs in a system bandwidth and, and a bit, which is of a first value, in the first bit table indicates that the PRB corresponding to the bit belongs to the resource region.

Optionally, in the embodiment of the disclosure, the indication information includes a starting frequency point and a second bit table, multiple bits in the second bit table correspond to multiple successive PRBs from the starting frequency point, there are one-to-one correspondences between the multiple bits and the multiple PRBs and, a bit, which is of a first value, in the second bit table indicates that the PRB corresponding to the bit belongs to the resource region.

Optionally, in the embodiment of the disclosure, the indication information includes a starting frequency point indicating a starting position of the resource region in the system bandwidth and an ending frequency point indicating an ending position of the resource region in the system bandwidth.

Optionally, in the embodiment of the disclosure, the indication information includes a starting frequency point indicating a starting position of the resource region in the system bandwidth and a bandwidth of the resource region.

Optionally, in the embodiment of the disclosure, the resource region includes at least one successive OFDM symbol starting from a first OFDM symbol in a first slot or a first mini-slot, and the indication information includes a total number of OFDM symbols belonging to the first slot or the first mini-slot in the resource region.

Optionally, in the embodiment of the disclosure, if the indication information indicates a frequency-domain parameter of the resource region, the first sending unit 310 is specifically configured to send the indication information to the first terminal device through a system message or high-layer signaling; and if the indication information indicates a time-domain parameter of the resource region, the first sending unit 310 is specifically configured to send the indication information to the first terminal device through the system message, the high-layer signaling or physical-layer signaling.

Optionally, in the embodiment of the disclosure, the high-layer signaling includes an RRC message, the system message includes a SIB message and a PBCH message, and the physical-layer signaling includes common signaling sent through at least one slot or at least one slot or dedicated signaling for the first terminal device.

Optionally, in the embodiment of the disclosure, the second sending unit 320 is specifically configured to adopt a beam corresponding to the resource region to send the downlink control signal to the first terminal device in the resource region.

Optionally, in the embodiment of the disclosure, the network device 300 further includes a dividing unit 330.

The dividing unit 330 is configured to divide each of at least one control channel configured to bear the downlink control signal into at least one control channel element and map the at least one control channel element onto the resource region for sending, multiple control channels corresponding to multiple terminal devices one-to-one and the multiple terminal devices including the first terminal device.

Optionally, in the embodiment of the disclosure, different control channel elements in the at least one control channel are mapped onto different PRBs and/or different OFDM symbols in the resource region, and/or at least one control channel element of a first control channel of the at least one control channel is mapped onto all OFDM symbols in the same PRB in the resource region, and/or different control channel elements in the at least one control channel are mapped onto at least part of PRBs in the same OFDM symbol in the resource region.

Optionally, in the embodiment of the disclosure, the network device 300 further includes a determination unit 340.

The determination unit 340 is configured to determine the resource region corresponding to a beam according to the beam adopted by the first terminal device, or determine the resource region corresponding to a neighbor cell according to the neighbor cell of the first terminal device, determine the resource region according to a position of the first terminal device in a cell and a mobility characteristic of the first terminal device, or determine the resource region according to a load of a network device.

It is to be understood that the signal transmission network device 300 according to the embodiment of the disclosure may correspond to the network device in the method embodiments of the disclosure and the abovementioned and other operations and/or functions of each unit in the network device 300 are adopted to implement the corresponding flows of the methods in FIG. 2 to FIG. 7 respectively and will not be elaborated herein for simplicity.

Figure 10:
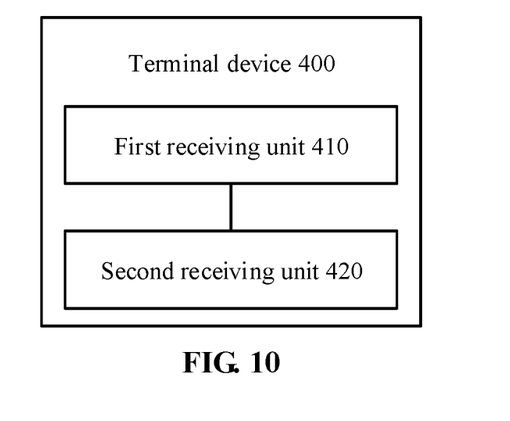
FIG. 10 illustrates a schematic block diagram of a signal transmission terminal device according to an embodiment of the disclosure.

FIG. 10 illustrates a signal transmission terminal device 400 according to an embodiment of the disclosure. As shown in FIG. 10, the terminal device 400 includes a first receiving unit 410 and a second receiving unit 420.

The first receiving unit 410 is configured to receive indication information sent by a network device, the indication information indicating a resource region for a first terminal device to receive a downlink control signal.

The second receiving unit 420 is configured to receive the downlink control signal sent by the network device in the resource region according to the indication information.

In such a manner, according to the signal transmission terminal device provided by the embodiment of the disclosure, the terminal device is caused to detect the control signal in a fixed region resource, so that system performance may be improved and energy consumption of the terminal device may be reduced.

Optionally, in the embodiment of the disclosure, the resource region includes at least one PRB and, when the resource region includes multiple PRBs, any two of the multiple PRBs are successive or discrete on a frequency domain.

Optionally, in the embodiment of the disclosure, the indication information includes a first bit table, there are one-to-one correspondences between bits in the first bit table and PRBs in a system bandwidth and, and a bit, which is of a first value, in the first bit table indicates that the PRB corresponding to the bit belongs to the resource region.

Optionally, in the embodiment of the disclosure, the indication information includes a starting frequency point and a second bit table, multiple bits in the second bit table correspond to multiple successive PRBs from the starting frequency point, there are one-to-one correspondences between the multiple bits and the multiple PRBs and, a bit, which is of a first value, in the second bit table indicates that the PRB corresponding to the bit belongs to the resource region.

Optionally, in the embodiment of the disclosure, the indication information includes a starting frequency point indicating a starting position of the resource region in the system bandwidth and an ending frequency point indicating an ending position of the resource region in the system bandwidth.

Optionally, in the embodiment of the disclosure, the indication information includes a starting frequency point indicating a starting position of the resource region in the system bandwidth and a bandwidth of the resource region.

Optionally, in the embodiment of the disclosure, the resource region includes at least one successive OFDM symbol starting from a first OFDM symbol in a first slot or a first mini-slot, and the indication information includes a total number of OFDM symbols belonging to the first slot or the first mini-slot in the resource region.

Optionally, in the embodiment of the disclosure, if the indication information indicates a frequency-domain parameter of the resource region, the first receiving unit 410 is specifically configured to receive the indication information sent by the first terminal device through a system message or high-layer signaling; and if the indication information indicates a time-domain parameter of the resource region, the first receiving unit 310 is specifically configured to receive the indication information sent by the network device through the system message, the high-layer signaling or physical-layer signaling.

Optionally, in the embodiment of the disclosure, the high-layer signaling includes an RRC message, the system message includes a SIB message and a PBCH message, and the physical-layer signaling includes common signaling sent through at least one slot or at least one slot or dedicated signaling for the first terminal device.

Optionally, in the embodiment of the disclosure, the second receiving unit 420 is specifically configured to receive at least one control channel element corresponding to a downlink control channel of the first terminal device from the network device in the resource region according to the indication information and generate the downlink control signal by combining the at least one control channel element.

Optionally, in the embodiment of the disclosure, the second receiving unit 420 is specifically configured to adopt a beam corresponding to the resource region to receive the downlink control signal sent by the network device in the resource region.

It is to be understood that the signal transmission terminal device 400 according to the embodiment of the disclosure may correspond to the terminal device in the method embodiments of the disclosure and the abovementioned and other operations and/or functions of each unit in the terminal device 400 are adopted to implement the corresponding flows of the method in FIG. 8 respectively and will not be elaborated herein for simplicity.

Figure 11:
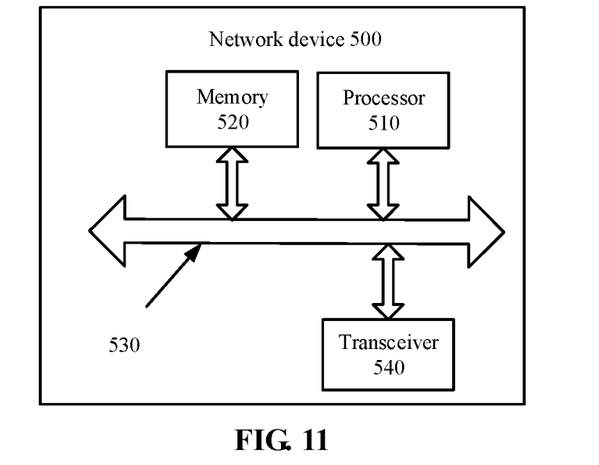
FIG. 11 illustrates another schematic block diagram of a signal transmission network device according to an embodiment of the disclosure.

As shown in FIG. 11, the embodiments of the disclosure also provide a signal transmission network device 500, which includes a processor 510, a memory 520, a bus system 530 and a transceiver 540. The processor 510, the memory 520 and the transceiver 540 are connected through the bus system 530. The memory 520 is configured to store an instruction. The processor 510 is configured to execute the instruction stored in the memory 520 to control the transceiver 540 to send a signal. The processor 510 is configured to send indication information to a first terminal device, the indication information indicating a resource region configured to receive a downlink control signal the first terminal device, and send the downlink control signal to the first terminal device in the resource region.

In such a manner, according to the signal transmission network device provided by the embodiment of the disclosure, the terminal device is caused to detect the control signal in a fixed region resource, so that system performance may be improved and energy consumption of the terminal device may be reduced.

It is to be understood that, in the embodiment of the disclosure, the processor 510 may be a Central Processing Unit (CPU) and the processor 510 may also be another universal processor, a Digital Signal Processor (DSP), an Application Specific Integrated Circuit (ASIC), a Field-Programmable Gate Array (FPGA) or another programmable logic device, discrete gate or transistor logic device and discrete hardware component and the like. The universal processor may be a microprocessor or the processor may also be any conventional processor and the like.

The memory 520 may include a Read-Only Memory (ROM) and a Random Access Memory (RAM) and provides an instruction and data for the processor 510. A part of the memory 520 may further include a nonvolatile RAM. For example, the memory. 520 may further store information of a device type.

The bus system 530 includes a data bus, and may further include a power bus, a control bus, a state signal bus and the like. However, for clear description, various buses in the figure are marked as the bus system 530.

In an implementation process, each step of the method may be completed by an integrated logic circuit of hardware in the processor 510 or an instruction in a software form. The steps of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable memory and a register. The storage medium is located in the memory 520. The processor 510 reads information in the memory 520 and completes the steps of the method in combination with hardware. No more detailed descriptions will be made herein to avoid repetitions.

It is to be understood that the signal transmission network device 500 according to the embodiment of the disclosure may correspond to the network device and network device 300 in the embodiments of the disclosure and may correspond to the network device executing the methods according to the embodiments of the disclosure and the abovementioned and other operations and/or functions of each unit in the network device 500 are adopted to implement the corresponding flows of the methods in FIG. 2 to FIG. 7 respectively and will not be elaborated herein for simplicity.

Figure 12:
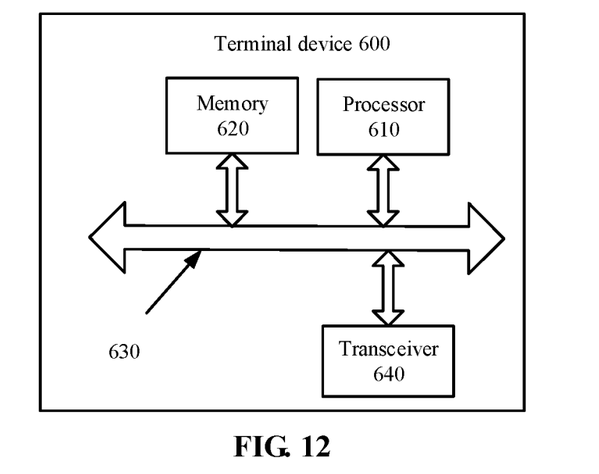
FIG. 12 illustrates another schematic block diagram of a signal transmission terminal device according to an embodiment of the disclosure.

As shown in FIG. 12, the embodiments of the disclosure also provide a signal transmission terminal device 600, which includes a processor 610, a memory 620, a bus system 630 and a transceiver 640. The processor 610, the memory 620 and the transceiver 640 are connected through the bus system 630. The memory 620 is configured to store an instruction. The processor 650 is configured to execute the instruction stored in the memory 620 to control the transceiver 640 to send a signal. The processor 610 is configured to receive indication information sent by a network device, the indication information indicating a resource region configured to receive a downlink control signal the first terminal device, and receive the downlink control signal sent by the network device in the resource region according to the indication information.

In such a manner, according to the signal transmission terminal device of the embodiment of the disclosure, the terminal device is caused to detect the control signal in a fixed region resource, so that system performance may be improved and energy consumption of the terminal device may be reduced.

It is to be understood that, in the embodiment of the disclosure, the processor 610 may be a CPU and the processor 610 may also be another universal processor, a DSP, an ASIC, an FPGA or another programmable logic device, discrete gate or transistor logic device and discrete hardware component and the like. The universal processor may be a microprocessor or the processor may also be any conventional processor and the like.

The memory 620 may include a ROM and a RAM and provides an instruction and data for the processor 610. A part of the memory 620 may further include a nonvolatile RAM. For example, the memory 620 may further store information of a device type.

The bus system 630 includes a data bus, and may further include a power bus, a control bus, a state signal bus and the like. However, for clear description, various buses in the figure are marked as the bus system 630.

In an implementation process, each step of the method may be completed by an integrated logic circuit of hardware in the processor 610 or an instruction in a software form. The steps of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable memory and a register. The storage medium is located in the memory 620. The processor 610 reads information in the memory 620 and completes the steps of the method in combination with hardware. No more detailed descriptions will be made herein to avoid repetitions.

It is to be understood that the signal transmission terminal device 600 according to the embodiment of the disclosure may correspond to the terminal device and terminal device 400 in the embodiments of the disclosure and may correspond to the terminal device executing the methods according to the embodiments of the disclosure and the abovementioned and other operations and/or functions of each unit in the terminal device 600 are adopted to implement the corresponding flows of the methods in FIG. 8 respectively and will not be elaborated herein for simplicity.

It is to be understood that the operations and/or functions of each unit in the terminal device provided in the embodiment of the disclosure correspond to the terminal device in the method side and interaction with the network device, the related characteristics, functions and the like correspond to the related characteristics and functions of the network device side and will not be elaborated herein for simplicity.

It is to be understood that, in the embodiments of the disclosure, "B corresponding to A" represents that B is associated with A and B may be determined according to A. It is also to be understood that determining B according to A does not mean that B is determined only according to A and B may also be determined according to A and/or other information.

Those of ordinary skill in the art may realize that the units and algorithm steps of each example described in combination with the embodiments disclosed in the disclosure may be implemented by electronic hardware, computer software or a combination of the two. For clearly describing exchangeability of hardware and software, the compositions and steps of each example have been generally described in the foregoing descriptions according to functions. Whether these functions are executed in a hardware or software manner depends on specific applications and design constraints of the technical solutions. Professionals may realize the described functions for each specific application by use of different methods, but such realization shall fall within the scope of the embodiments of the disclosure.

Those skilled in the art may clearly learn about that specific working processes of the system, device and unit described above may refer to the corresponding processes in the method embodiments and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system. In addition, each functional unit in each embodiment of the application may be integrated into a processing unit, each unit may also physically exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable storage medium. Based on such an understanding, the technical solutions of the application substantially or parts making contributions to the conventional art or all or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation of the application and not intended to limit the scope of protection of the application. Various equivalent modifications or replacements are apparent to those skilled in the art within the technical scope disclosed by the application.

The invention claimed is:

1. A method for signal transmission, comprising:
   sending indication information to a first terminal device, the indication information indicating a resource region for the first terminal device to receive a downlink control signal;
   sending the downlink control signal to the first terminal device in the resource region; and
   dividing each of at least one control channel configured to bear the downlink control signal into at least one control channel element and mapping the at least one control channel element onto the resource region;
   wherein at least one control channel element of a first control channel of the at least one control channel is mapped onto all Orthogonal Frequency Division Multiplexing (OFDM) symbols in a same Physical Resource Block (PRB) in the resource region,
   wherein the indication information comprises a starting frequency point and bit codes, multiple bits in the bit codes correspond to multiple successive PRBs from the starting frequency point, there are one-to-one correspondences between the multiple bits and the multiple PRBs and, a bit, which is of a first value, in the bit codes indicates that the PRB corresponding to the bit belongs to the resource region.

2. The method of claim 1, wherein the resource region comprises multiple Physical Resource Blocks (PRBs) and any two of the multiple PRBs are successive or discrete on a frequency domain.

3. The method of claim 1, wherein sending the downlink control signal to the first terminal device in the resource region comprises:
   sending the downlink control signal to the first terminal device in the resource region by using a beam corresponding to the resource region, wherein different resource regions correspond to different beams.

4. A method for signal transmission, comprising:
   receiving indication information sent by a network device, the indication information indicating a resource region for a first terminal device to receive a downlink control signal; and
   receiving the downlink control signal sent by the network device in the resource region according to the indication information,
   wherein the downlink control signal is born in at least one control channel, each of at least one control channel is divided into at least one control channel element, and at least one control channel element of a first control channel of the at least one control channel is mapped onto all Orthogonal Frequency Division Multiplexing (OFDM) symbols in a same Physical Resource Block (PRB) in the resource region,
   wherein the indication information comprises a starting frequency point and bit codes, multiple bits in the bit codes correspond to multiple successive PRBs from the starting frequency point, there are one-to-one correspondences between the multiple bits and the multiple PRBs and, a bit, which is of a first value, in the bit codes indicates that the PRB corresponding to the bit belongs to the resource region.

5. The method of claim 4, wherein the resource region comprises multiple Physical Resource Blocks (PRBs) and any two of the multiple PRBs are successive or discrete on a frequency domain.

6. The method of claim 5, wherein the indication information comprises a starting frequency point indicating a starting position of the resource region in the system bandwidth and an ending frequency point indicating an ending position of the resource region in the system bandwidth.

7. The method of claim 5, wherein the indication information comprises a starting frequency point indicating a starting position of the resource region in the system bandwidth and a bandwidth of the resource region.

8. The method of claim 5, wherein receiving the indication information sent by the network device comprises:
receiving the indication information sent by the network device through a system message or high-layer signaling.

9. The method of claim 4, wherein the resource region comprises at least one successive Orthogonal Frequency Division Multiplexing (OFDM) symbol starting from a first OFDM symbol in a first slot or a first mini-slot, and the indication information comprises a total number of OFDM symbols belonging to the first slot or the first mini-slot in the resource region.

10. The method of claim 9, wherein receiving the indication information sent by the network device comprises:
receiving the indication information sent by the network device through a system message, high-layer signaling or physical-layer signaling.

11. The method of claim 10, wherein the high-layer signaling comprises a Radio Resource Control (RRC) message, the system message comprises a System Information Block (SIB) message and a Physical Broadcast Channel (PBCH) message, and the physical-layer signaling comprises common signaling sent through at least one slot or at least one mini-slot or dedicated signaling for the first terminal device.

12. The method of claim 4, wherein receiving the downlink control signal sent by the network device in the resource region according to the indication information comprises:
receiving at least one control channel element corresponding to a downlink control channel of the first terminal device from the network device in the resource region according to the indication information; and
generating the downlink control signal according to the at least one control channel element.

13. The method of claim 4, wherein receiving the downlink control signal sent by the network device in the resource region comprises:
receiving the downlink control signal sent by the network device in the resource region by using a beam corresponding to the resource region, wherein different resource regions correspond to different beams.

14. A terminal device for signal transmission, comprising:
a memory storing instructions;
a processor configured to execute the instructions to:
receive indication information sent by a network device, the indication information indicating a resource region for a first terminal device to receive a downlink control signal; and
receive the downlink control signal sent by the network device in the resource region according to the indication information,
wherein the downlink control signal is born in at least one control channel, each of at least one control channel is divided into at least one control channel element, and at least one control channel element of a first control channel of the at least one control channel is mapped onto all Orthogonal Frequency Division Multiplexing (OFDM) symbols in a same Physical Resource Block (PRB) in the resource region,
wherein the indication information comprises a starting frequency point and bit codes, multiple bits in the bit codes correspond to multiple successive PRBs from the starting frequency point, there are one-to-one correspondences between the multiple bits and the multiple PRBs and, a bit, which is of a first value, in the bit codes indicates that the PRB corresponding to the bit belongs to the resource region.

15. The terminal device of claim 14, wherein the resource region comprises multiple Physical Resource Blocks (PRBs) and any two of the multiple PRBs are successive or discrete on a frequency domain.

16. The terminal device of claim 15, wherein the indication information comprises a starting frequency point indicating a starting position of the resource region in the system bandwidth and an ending frequency point indicating an ending position of the resource region in the system bandwidth.

17. The terminal device of claim 15, wherein the indication information comprises a starting frequency point indicating a starting position of the resource region in the system bandwidth and a bandwidth of the resource region.

18. The terminal device of claim 15, wherein the processor further executes the instructions to:
receive the indication information sent by the network device through a system message or high-layer signaling.

19. The terminal device of claim 14, wherein the processor is further configured to:
receive the downlink control signal sent by the network device in the resource region by using a beam corresponding to the resource region, wherein different resource regions correspond to different beams.

* * * * *